Figure 1:
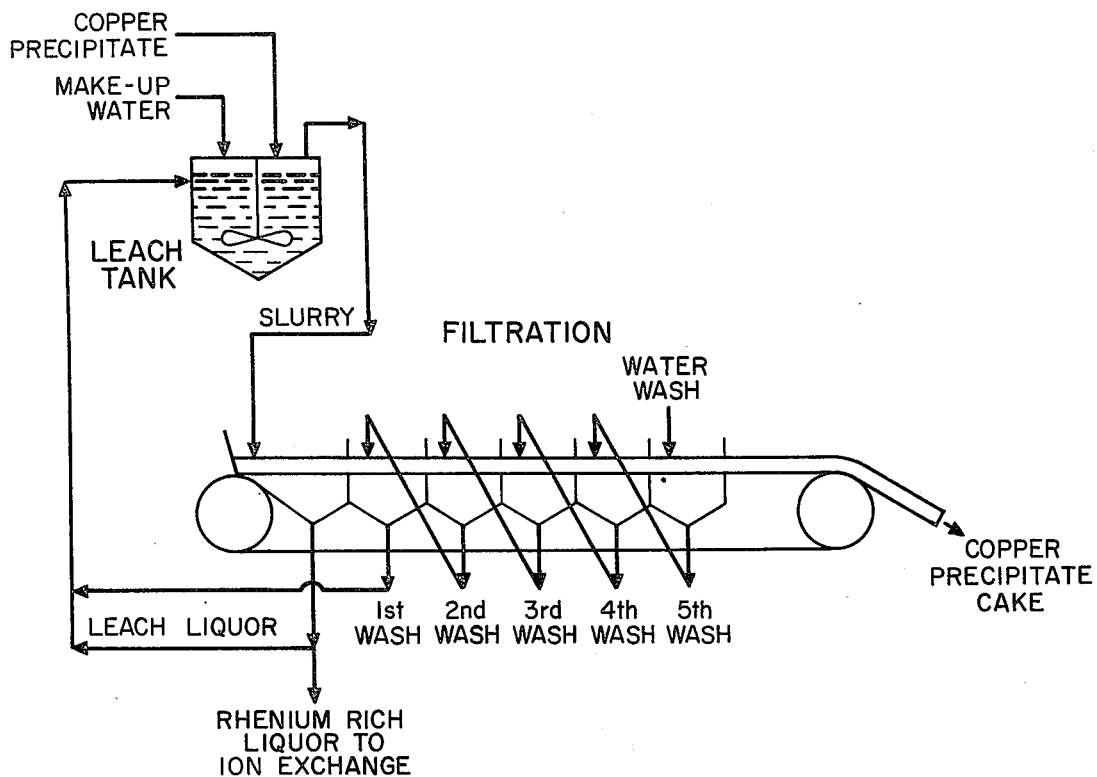

United States Patent [19]

Ammann

[11] 3,915,690

[45] Oct. 28, 1975

[54] RECOVERY OF RHEMIUM FROM PRECIPITATE COPPER

[75] Inventor: Paul R. Ammann, Boxford, Mass.

[73] Assignee: Kennecott Copper Corporation, New York, N.Y.

[22] Filed: Feb. 20, 1975

[21] Appl. No.: 551,564

Related U.S. Application Data

[63] Continuation-in-part of Ser. No. 323,610, Jan. 15, 1973; which is a continuation-in-part of Ser. No. 106,076, Jan. 13, 1971, now abandoned.

[52] U.S. Cl....... 75/101 R, 75/101 BE, 75/108, 75/109, 75/117, 75/121; 423/49, 423/50, 423/561, 423/593, 423/605
[51] Int. Cl.² ............... C22B 61/00; C01G 47/00
[58] Field of Search........ 75/101 R, 101 BE, 109, 75/117, 121; 423/49, 50

[56] References Cited
UNITED STATES PATENTS

| | | | |
|---|---|---|---|
| 3,578,395 | 5/1971 | Kluksdahl et al. | 423/49 |
| 3,672,874 | 6/1972 | Wiley | 75/121 |

OTHER PUBLICATIONS
Hampel, "Rare Metals Handbook," Reinhold Pub. Corp., N.Y., 1954, pp. 347–351.

*Primary Examiner*—Herbert T. Carter
*Attorney, Agent, or Firm*—Lowell H. McCarter; John L. Sniado, et al.

[57] ABSTRACT

Rhenium present in a precipitated copper product in amounts varying between from about 5 to about 300 or more parts per million is recovered by a process that includes the steps of selectively leaching the rhenium from the precipitate copper product and recovering the rhenium from the leach solution.

18 Claims, 2 Drawing Figures

INVENTOR:
PAUL R. AMMANN
By ATTORNEY
Lowell H. McCarter

RECOVERY OF RHENIUM FROM PRECIPITATE COPPER

FIELD OF INVENTION

This application is a continuation-in-part of U.S. Serial No. 323,610, filed January 15, 1973, which in turn is a continuation-in-part of U.S. Serial No. 106,076 filed January 13, 1971 both now abandoned.

This invention relates to the recovery of rhenium values from precipitated copper products which contain the same.

The only known commercial source of rhenium is from molybdenite concentrate. In conventional practice molybdenite concentrate, derived as a by-product of the mining of copper sulfide ores, is roasted for the production of commercial molybdic oxide. When such concentrates also contain significant quantities of rhenium, e.g., in the range of from 0.01% to 0.20%, it is common practice to treat the flue dust and the effluent gases for the recovery of rhenium volatilized by the roasting. Although a high grade molybdic oxide is produced in this manner when the grade of the molybdenite concentrates is high, recovery of rhenium content of the concentrates is limited.

Rhenium has never been identified as a separate mineral species and, with the exception if certain molybdenites, is rarely found associated in ores of concentrations greater than 1 ppm. It is thought to be present in most ores as a sulfide, having separated in this form during the crystallization and cooling of the magma in the earth's magnetic core. X-ray diffraction studies of molybdenite samples indicate that rhenium sulfide is present in solid solution with molybdenite.

SUMMARY AND OBJECTS

Molybdenite, as previously indicated, is the only known commercial source of rhenium. Therefore it is the principal object in the present invention to provide a method of recovering rhenium from a heretofore unknown source. It is another object of this invention to recover small amounts of rhenium from a material which heretofore was not recognized as containing any significant quantities of rhenium. Yet another object of the invention is to concentrate rhenium relative to the precipitate content to effect economic recovery of the rhenium.

In a series of laboratory investigations of precipitated copper products, it was discovered that the copper product may contain from about 10 ppm to about 300 or more parts per million rhenium. This invention then relates to a process of recovering rhenium from precipitate copper.

One embodiment of this invention comprises the steps drying the precipitate copper in an oxidizing environment which may be air, oxygen, and mixtures thereof, leaching the dried precipitate copper with a solvent for the rhenium, and concentrating the leach solution to obtain rhenium in sufficient concentrations to economically recover the rhenium.

In another embodiment the rhenium containing precipitate copper is slurried with a rhenium solvent in the presence of an oxidizing agent to obtain a rhenium containing leach solution. The leach solution is concentrated to obtain rhenium in sufficient concentrations to economically recover the rhenium.

DESCRIPTION

The term "precipitate copper" or "copper precipitate" as used in this specification and the appended claims is any precipitated copper product which has been obtained from aqueous solutions by chemical reaction or electrochemical reduction to produce a solid particulate copper product which can be readily separated from the aqueous solutions. Thus the process of this invention has general applicability. The standard oxidation-reduction potential tables show that any elements that will precipitate copper from solution will also precipitate rhenium. It is well known that any element above copper in the electrochemical series will precipitate copper from solution by chemical reaction. These elements include, but are not limited to, bismuth, hydrogen, lead, tin, nickel, cobalt, cadmium, iron, chromium, zinc, manganese, aluminum, magnesium, tungsten, vanadium, beryllium, thorium, sodium, calcium, potassium and lithium. Hydrogen sulfide may also be used to precipitate copper from solutions. For commercial purposes the preferred chemical precipitating agent is iron. Others of interest are hydrogen, tin, zinc, aluminum and magnesium.

Electrochemical precipitation processes of copper containing aqueous solutions to provide a particulate solid copper product are illustrated by U.S. Patent No. 3,682,798, W.M. Tuddenham et al., assigned to Kennecott Copper Corporation, and U.S. Patent No. 3,692,647, W. L. Chambers et al., assigned to Chamber's Process Ltd. These U.S. patents are incorporated by reference herein insofar as they contain essential material necessary for adequate disclosure of the invention claimed herein.

Aqueous solutions of copper, such as are commonly derived by the leaching of copper bearing ore materials with a dilute solution of sulfuric acid and ferric sulfate, are ordinarily stripped of their copper content by passage over scrap iron, such as detinned and shredded tin cans, or by being brought into contact with metallic iron by agitation therewith in a liquid-solids contact vessel. The iron reacts with the solution to replace the copper with ferrous sulfate and leaves metallic copper as a precipitate, i.e., "cemented". Therefore the term "cement copper" may be used to refer to copper precipitated from an acid solution by contact with iron or an iron containing material.

Copper containing solutions may be obtained in several ways. An ore body containing copper may be leached in situ where the ore body is too low in grade to make it amenable to treatment by any other method. Heap leaching is similar to leaching in situ, the principal difference being that the ore is removed from the mine and so arranged as to permit more effective contact of the oxidizing agents and lixiviant with the minerals so that maximum extraction of copper values can be obtained. The oxidizing agent could be air, oxygen and mixtures thereof.

Yet another source of aqueous solutions of copper is the percolation leaching. In percolation leaching it is necessary to reduce the size of the ore particles to effect satisfactory dissolution of the minerals in the ore. Percolation leaching is generally done in vats capable of holding large quantities of ore. Still another source of copper and rhenium containing solutions may be obtained from the leach-precipitation-flotation system. This recovery system may be applied to copper sulfide ores containing some copper oxide minerals. Sulfide ores frequently will contain from about 0.01–0.1% oxide copper. See A. W. Last, Mining Congr. J. 45 (10), 108–111 (1959). Another source of copper leach solutions, i.e., water containing dissolved copper, rhenium and other metal compounds, may be the various streams of water from flotation processes. Conditions in several operations of flotation are conducive to dissolution of rhenium compounds. Waste streams from rhenium processing plants may be evaporated to dryness. The sludge thus formed may then be treated by the process of this invention to remove any rhenium remaining in the sludge. Yet another source of precipitate copper is in-plant solutions containing copper and rhenium. An example of in-plant solutions include solutions obtained by removal of copper by leaching in the manufacturing of molybdic oxide.

Any of the aforementioned processes for obtaining aqueous copper containing solutions generally contain minute amounts of rhenium. This includes precipitate copper that is the product of contacting an aqueous copper containing solution with metallic iron. When the copper containing solutions are precipitated by some form of metallic iron, or any of the other elements specifically set forth above, a substantial portion of the rhenium content precipitates along with the copper. Copper containing solutions and/or mine waters are fed to launders or cones filled with scrap iron or other precipitating apparatus, such as in U.S. Patent No. 3,479,020, where a pregnant solution is contacted with iron to precipitate the copper. The precipitate copper obtained from the copper containing solutions contains some metallic iron and ferrous ion in the liquor trapped in the precipitate copper. This results in reducing conditions favorable for maintaining any rhenium present as insoluble oxides or metal in the copper precipitate. Rhenium content of such copper precipitates may vary from about 5 to about 300 or more ppm and can be recovered by the process of this invention.

In another embodiment of my invention, it has been found that rhenium may be leached from precipitate copper without the necessity of providing an oxidizing environment in the leach solution when the precipitate copper contains between about 1 and about 10% oxygen by weight. When the source material, i.e., the precipitate copper, contains between about 1 to 10% by weight oxygen, the rhenium containing precipitate copper is leached with a leach solution selected from the group consisting of water, an aqueous acid solution and an aqueous caustic solution whereby the rhenium is selectively solubilized from the precipitate copper. A rhenium-rich leach solution is recovered and processed to provide a rhenium product.

Copper precipitates or cement copper containing substantial quantities of oxygen may be obtained in a process such as is described in U.S. Pat. No. 3,457,065. This patent teaches the injection of air into the cone precipitation device creating substantial turbulence during the precipitation of the copper particles. Copper recovery is said to be enhanced using the air injection during the precipitation of the copper particles. Inherently, however, the particulate copper precipitate product may become partially oxidized and thus will contain significant quantities of oxygen.

In following the teachings of U.S. Pat. No. 3,567,018, another source of precipitate copper containing oxygen is disclosed. This patent teaches improvements in filtering cement copper precipitates by filter-press techniques. The filter-press is used for dewatering copper precipitate slurries. After the dewatering step, a gas such as air, oxygen or mixtures thereof is blown through the filter cake to remove residual moisture therein. During this air blowing step, the filter cake of copper precipitate will pick up substantial quantities of oxygen and thus providing an oxidizing environment for the rhenium in the copper precipitate filter cake. As shown in example V and Table IV below, the air blown copper precipitate filter cake may contain substantial quantities of oxygen.

Because of the low concentrations of rhenium in the copper it is difficult to obtain identification of the chemical nature of the rhenium. The rhenium which is coprecipitated along with the copper in the cementation process is believed to be a mixture of products such as $ReO_3$, $ReO_2$, $Re_2O_3$, $ReO$ and $Re$. However, it should be recognized that the rhenium may also be present in the copper precipitate as any one of a number of copper-rhenium oxide compounds. Other rhenium containing compounds may also exist. Rhenium will remain in the copper precipitate so long as reducing conditions exist. The major constituents are probably $ReO_2 \cdot 2H_2O$ and $Re°$. Both of these latter constituents are very insoluble except in oxidizing solutions or an oxidizing environment such as air, oxygen or mixtures thereof where the rhenium is oxidized to the perrhenate ion which is readily soluble in water. Thus, rhenium may be leached from the precipitate copper in acid, neutral, or basic solutions having an oxidizing potential sufficient to solubilize the rhenium. Neutral or basic solutions are preferable for rate and selectivity of leaching.

An important factor in the complete recovery of rhenium from precipitate copper by leaching is the treatment of the precipitate prior to or during the extraction of the rhenium. For example, rhenium can be completely leached from precipitate copper by drying the precipitate copper in an oxidizing environment such as by contacting the precipitate copper with air at ambient or elevated temperatures prior to leaching. Oxygen or mixtures of air and oxygen at ambient or elevated temperatures may also be used. Indeed any oxidizing agent having an oxidizing potential equivalent to air which does not render the copper soluble and/or the rhenium insoluble in the leach solution may be used. Rhenium can also be leached from precipitate copper by leaching with a hot water solution which is saturated with air, i.e., bubbling air up through the solution.

The oxidation of the copper is undesirable from the standpoint of further precipitate copper processing. There is the propensity, when leaching with an acid solution in the process of this invention, to oxidize more of the copper than is preferable. Precipitate copper with an oxygen content between about 1% and about 10% by weight is preferred. By proper adjustment of the pH values of the leach solution the undesired oxidation of copper and the desired oxidation of rhenium compounds can be balanced against each other to selectively remove soluble oxidized rhenium. For example, in leaching precipitate copper after it is dried in an oxidizing environment of air, oxygen or mixtures thereof, a leach solution with a pH of above about 6.5 will selectively remove soluble oxidized rhenium from the precipitate copper.

The copper precipitate as received from the precipitation apparatus is, in the first step of the process of this invention, slurried with a solvent for the rhenium contained in the precipitate. This solvent may be acid, but is preferably neutral or basic. Precipitate copper or cement copper as received often contains sufficient retained acid and retained ferrous ion that may cause some difficulties. By controlling the pH value of the solvent-copper precipitate slurry to a value above about 6.5, high recovery efficiencies based upon the amount of rhenium in the precipitate copper can be obtained. Control of the pH may be accomplished by adding an acid or a base to the solvent. pH control is preferably accomplished with sodium carbonate or sodium hydroxide. The precipitate copper may also be leached with solutions containing considerable amounts of caustic, for example, one normal or more caustic solutions may be used. It is preferred to use a less than 1 normal caustic solution. The leach solution must be partially oxidizing in order to oxidize the lower oxides of rhenium in the precipitate to the water soluble perrhenate ion. The rhenium is present as ReO, $ReO_2 \cdot H_2O$, elemental rhenium, copper-rhenium oxides, and mixtures thereof. The rhenium concentration should be between about 5 to about 300 parts per million. The preferred method of supplying oxidizing conditions in the leach solution is to bubble air, oxygen or mixtures thereof up through the solution. However, any oxidizing agent having an oxidizing potential equivalent to air that does not render the copper soluble and/or the rhenium insoluble in the leach solution may be used. Examples of oxidizing agents that may be used include oxygen-enriched iodine and sodium hypochlorite.

A slurry containing from about 10 to about 60%, and preferably between about 30 and 50% solids is prepared in a leaching vessel. Agitation of the slurry may be beneficial. Mechanical agitation may be used or air, oxygen or mixtures thereof under pressure may be bubbled up through the slurry. The slurry is agitated or stirred for at least about 10 minutes or up to as long as about 10 hours. As shown by the examples presented below the leach may be performed at room temperature or at an elevated temperature between about 25 and 100°C.

After the precipitate copper has remained in contact with the solvent for the required length of time the slurry is pumped to a solids-liquid separator, i.e., settling tank, filter etc. The solids are then washed by water displacement one or more times to remove any rhenium remaining entrapped in the cement copper solids. One good wash may suffice, although several washes may be necessary to effect complete recovery. The washing is preferably counter-current to the solids flow. The operation of the leach-filtration steps results in a concentration of the rhenium in the aqueous phase as compared to the original copper precipitate. Preferably the leach solution is concentrated so that the rhenium content is from about 0.02 to about 0.08 grams per liter, or higher if possible.

The rhenium in the aqueous phase from the solids-liquid separation is then fed to the rhenium recovery system. The leach liquor may be treated by any one of several different methods to recover the rhenium. The rhenium may be recovered from the leach liquor as rhenium metal or as a specific compound of rhenium. The form in which and the means by which the rhenium is recovered from the leach liquor does not constitute part of this invention. It is to be understood that the following suggested ways and/or forms in which the rhenium is recovered are presented merely by way of illustration and not limitation. Specific non-limiting forms in which the rhenium can be recovered from the leach liquor may include perrhenic acid, potassium perrhenate, ammonium perrhenate, rhenium sulfide, calcium perrhenate and iron perrhenate. Other specific rhenium compounds may also result depending upon the method of recovery and the desired end product.

Figure 2:
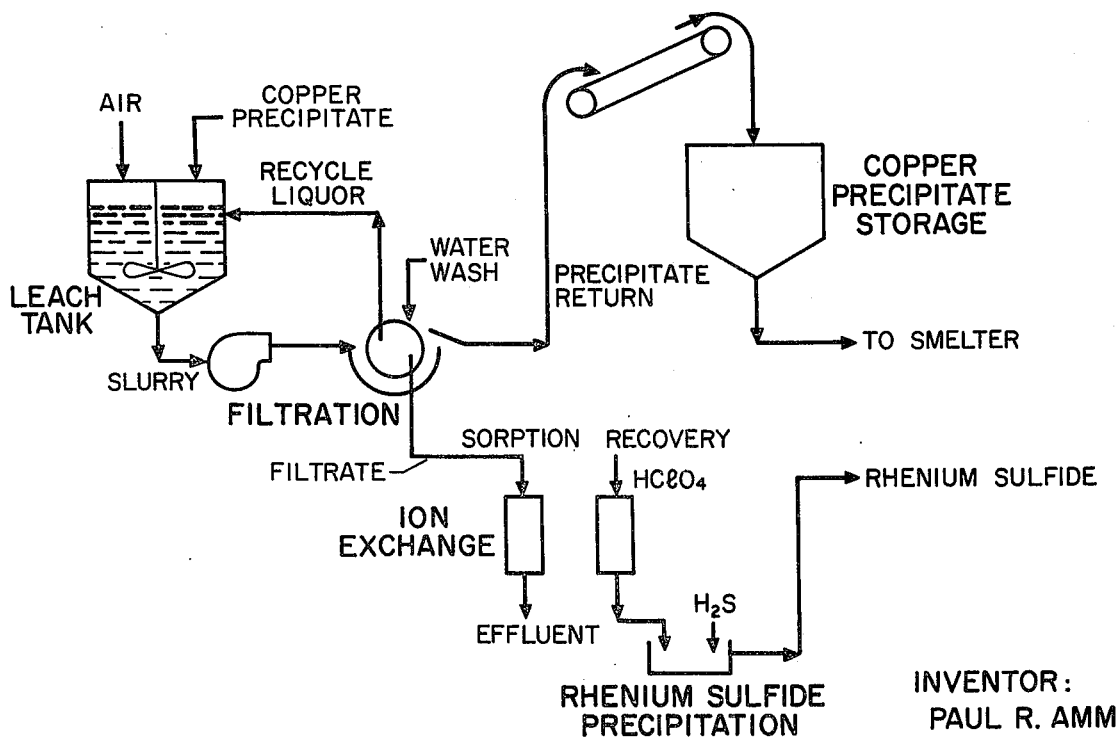

The preferable recovery system is ion exchange as illustrated in FIGS. 1 and 2. Reduction and precipitation, evaporation and precipitation, evaporation and crystallization, and solvent extraction are some of the other methods that may be used to recover the rhenium from the leach solution.

Basic solid ion exchange resins or liquid ion exchange solutions, when contacted with rhenium bearing solutions, adsorb the rhenium from the solution. The rhenium can then be eluted from the resins with a stripping solution of concentrated perchloric, sulfuric or nitric acid.

In the solvent extraction technique the rhenium is extracted from the rhenium bearing leach solution into a basic organic compound, such as a soluble quaternary amine dissolved in an organic solvent. (See for example U.S. Patent No. 3,244,475.) The rhenium is subsequently stripped from the organic compound with a strong acid.

The dilute rhenium bearing leach solutions may be evaporated to concentrate the rhenium. By controlling the pH of the solution and the addition of chemicals such as ammonia or potassium hydroxide, the rhenium may then be crystallized out of the solution as perrhenates.

By contacting the dilute rhenium bearing solutions with a chemical reducing agent, for example, iron, zinc, or sulfur dioxide, the rhenium is converted to an insoluble form such as rhenium oxide. The rhenium is thus precipitated from the solution and may be recovered by solids-liquid separation.

In a counter-current bath system, such as that shown in FIG. 1, the last wash of the copper precipitate is done using water having a pH value preferably above 6.5, the wash water from the last wash is then used to wash the copper precipitate in the penultimate wash. The penultimate wash solution is then used to wash the copper precipitate in next preceding wash step and so on until the required number of washes is obtained. The first wash liquor is pumped to the leaching tank. A portion of the leach liquor from the first solids-liquid separation is fed to a solid or liquid ion exchange extraction column to recover the rhenium from liquor. In this manner the rhenium content of the solution is concentrated in order to obtain an economic recovery of rhenium.

FIG. 2 depicts a continuous process for recovery of rhenium from cement copper. The precipitate copper is slurried in a leach tank with a portion of the recycle liquor from the filtration and wash step. Air is bubbled up through the slurry to provide the required oxidation. If the pH value of the slurry drops below about 6.5 a caustic solution may be added to the contents of the leach tank. After a sufficient contact time between the copper precipitate and the leach solution the slurry is pumped to the filtration and wash station. A portion of the leach liquor from the filtration is fed to a recovery system. The remaining portion of the leach liquor is returned to the leach tank to leach another unit of copper precipitate.

The leach liquor is passed through a strong base, quaternary amine, ion exchange resin where the rhenium is adsorbed onto the resin. This continues until the resin is saturated with rhenium. The saturated resin is treated by washing with water and dilute hydrochloric acid. The rhenium is then stripped from the resin by the action of perchloric acid solution by forming perrhenic acid, $HReO_4$. The rhenium may then be recovered from the perchloric acid solution by precipitation with hydrogen sulfide, cementation with iron, or electrodeposition.

The following specific examples are illustrative but not limitative of my invention, it being understood that similar results are obtained with minor changes in process parameters. All such variations which do not depart from the basic concept of the invention disclosed are intended to come within the scope of the appended claims.

EXAMPLE I

Two hundred and fifty grams of precipitate copper were slurried in contact with air in 250 ml of 5 weight percent sodium carbonate (pH — 12) and stirred for 1 hour at room temperature. The slurry was filtered, with the filtrate returned to the leach vessel where it was contacted with another 250 grams of precipitate. The filter cake was washed with 100 ml of new wash solution. In each stage the precipitate was washed with the filtrate from the next down stream stage. In the last stage, the cake was washed with water. See FIG. 1. Table I shows the results. In the overall experiment, 33,125 micrograms of rhenium were extracted compared to 28,750 micrograms of rhenium contained in the precipitate indicating that all the rhenium was extracted. Although the rhenium recovery was greater than 100% the results are within the precision of the analysis used.

TABLE I

Rhenium Extraction with 1 Normal $Na_2CO_3$ (5 weight percent)

Weight of Precipitate per Cycle: 250 grams (Dry Basis)
Rhenium Input per Cycle: 5,750 µg
Number of Cycles: 5
Total Rhenium Input: 28,750 µg Re (23 µg Re/gm Dry Basis)

| Item | Volume (ml) | Rhenium Conc. (µg Re/ml) | Total rhenium Extracted (µg Re) |
|---|---|---|---|
| Leach liquor | 170 | 127 | 21,590 |
| 1st wash | 100 | 108 | 10,800 |
| 2nd wash | 105 | 7 | 735 |
| 3rd wash | 105 | <3 | |
| 4th wash | 109 | <3 | |
| 5th wash | 101 | <3 | |
| Total | | | 33,125 +µg Re (115%) 26, 5 µg Re/gm ppt |

EXAMPLE II

Two hundred and fifty grams of copper precipitate was slurried in contact with air at room temperature with tap water having a pH from about 6.5 to 7.0. The slurry was stirred for 1 hour. The precipitate was filtered off and the precipitate washed 5 times with water. The distribution of the rhenium in the liquor and 5 washes is reported for two runs in Table II.

TABLE II

Extraction of Rhenium from Precipitate Copper with Water

| Run No. | WL-1 Rhenium Extraction | | WL-2 Rhenium Extraction | |
|---|---|---|---|---|
| | (µg Re) | (% of Total) | (µg Re) | (% of Total) |
| Liquor | 3,550 | 64.5 | 3,450 | 63.3 |
| Wash 1 | 1,750 | 31.8 | 1,850 | 34.1 |
| Wash 2 | 200 | 3.6 | 125 | 2.3 |
| Wash 3 | (<75) | | (<75) | |
| Wash 4 | (<75) | | (<75) | |
| Wash 5 | (<75) | | (<75) | |
| Total | 5,500+ | 100.0 | 5,425 | 100.0 |
| Feed in 250 Grams Precipitate | 5,750 | | 5,750 | |
| Overall Extraction (Percent) | 96 | | 94.3 | |
| Specific Extraction | 22 (µg Re/gm) | | 21.7 (µg Re/gm) | |
| Solution pH | 6.56–7.0 | | 6.18–7.4 | |

EXAMPLE III

The leach liquors and washes from two extraction experiments were passed through a fixed bed of quaternary amine ion exchange resin. The solutions were fed with the most dilute with respect to rhenium concentration being first. The data for the two experiments are presented in Table III. The ion exchange resin was completely effective, within the experimental precision, for removing the rhenium from the liquors and washes. In accordance with U.S. Patent No. 2,876,065, the resin with the rhenium absorbed thereon was washed with water and dilute hydrochloric acid, and then flushed with 10% perchloric acid to recover the rhenium as perrhenic acid. As the data shows, from about 95 to 100 percent of the rhenium feed to the ion exchange resin is recovered in the perchloric acid.

TABLE III

Recovery of Rhenium from Leach Liquor by Ion Exchange

| Ion Exchange Sorption from Leach Liquors and Washes | Rhenium Balance (μg Re) | |
|---|---|---|
| | Run No. 1 | Run No. 2 |
| Wash 5 | 0 | |
| Wash 4 | 237.5 | |
| Wash 3 | 624 | |
| Wash 2 | 1,870 | 2,091 |
| Wash 1 | 3,717 | 2,550 |
| Liquor | 6,222 | 2,805 |
| Total Feed | 12,671 | 7,446 |
| Treated Liquor | <1,000 | <500 |
| Net Absorption | >11,671 | >6,946 |
| Ion Exchange Recovery: | | |
| Water Wash | 0 | 0 |
| HCl Strip | 0 | 0 |
| HClO$_4$ Strip | 13,108 (103%) | 6,625 (94.8%) |

EXAMPLE IV

In order to verify adaptation of the results of previous experiments, a relatively large quantity of copper precipitate, i.e., fifteen pounds, was leached in the presence of air with well water having a pH of about 6–7 at about 25°C, using the leach liquor and wash recycle as previously described and as shown in FIG. 1. The leach liquor was built up so as to contain about 0.08 grams of rhenium per liter. All of the leach liquor and wash solutions were passed through a strong base ion exchange resin (average loading 0.02 grams rhenium per liter) which extracted 88 percent of the rhenium (from the copper precipitate). The resin was washed with distilled water, 5% hydrochloric acid, and then stripped with 10% perchloric acid. The effluent contained 2 grams of rhenium per liter and was treated with hydrogen sulfide to precipitate the rhenium as a sulfide. The rhenium sulfide was filtered and washed.

EXAMPLE V

Seven 50 gram samples (See Table IV) of air dried precipitate copper containing from about 0.9 to about 12.8 percent oxygen by weight (dry) basis were each mixed with water to make a slurry of 50 grams (dry) precipitate to 100 grams of water. The slurries were stirred for 1 hour at room temperature.

In the initial experiments, the pH of the solution dropped to 2 or 3 when the slurries were prepared indicating that residual acid was present in the copper. In subsequent experiments, the pH was raised and maintained from about 7 to 8 by small additions of Na$_2$CO$_3$. After the one hour leach, the slurries were filtered and the liquor collected. The precipitates were washed with a quantity of water approximately equal to that in the cake, and the first wash was collected. A similar second wash followed. The rhenium concentration was measured in each solution, and the total rhenium concentration was measured in each solution, and the total rhenium leached was calculated relative to the weight of the dry precipitate.

The moisture content of the precipitate copper was measured by placing 10 gram samples of the copper precipitate as received in a furnace. By heating the precipitate in dry nitrogen the water was driven off, collected in an adsorbent and weighed. Subsequently, the sample was heated to 800°C and hydrogen passed over the sample to remove oxygen as water vapor which was collected in an adsorbent. This gave an imprecise estimate of the oxygen content of the sample. However, the measurement of the oxygen content should be satisfactory for most purposes.

The analysis of the precipitate copper for iron, oxygen and rhenium, all on a dry basis, and the rhenium extractions are presented in Table IV.

It should be noted that rhenium extractions varied from about 25% at the lowest oxygen level up to 90 to 100% at the highest oxygen content. From this it is clear that when the copper precipitate has an oxygen content of from about 6 to 10% that better than 85% of the rhenium content in the precipitate is leached in a neutral solution or basic solution, i.e., having a pH of above about 6.5.

TABLE IV

Chemical Analyses and Rhenium Extractions for Copper Precipitate Samples

| Sample Number | Precipitate Copper Product | Initial Water (weight %) | Analysis (Dried in N$_2$) | | | Re (ppm) | Rhenium Leach | |
|---|---|---|---|---|---|---|---|---|
| | | | Cu (weight %) | Fe (weight %) | O$_2$ (weight %) | | (ppm)* | (% initial) |
| 1 | Powdered Iron Cone Precipitate underflow | 44.3 | 59.5 | 17.8 | 1.7 | 183 | 50 | 27.3 |
| 2 | Dried precipitate at 50°C for 14 hours in air | 12.2 | 39.0 | 19.9 | 7.0 | 270 | 270 | 100 |
| 3 | Cone and Thickener underflow | 47.2 | 93.2 | 1.0 | 0.9 | 23 | 5.3 | 23 |
| 4 | Airblown filter cake dried at 80°C for 23 hours | 2.3 | 88.8 | 1.2 | 10.0 | 17.4 | 19.0 | 109 |
| 5 | Airblown filter cake | 15.1 | 94.1 | 0.7 | 4.7 | 23 | 15.9 | 69 |
| 6 | Airblown filter cake | 15.3 | 85.8 | 1.0 | 12.8 | 25 | 22.1 | |
| 7 | Airblown filter cake dired in N$_2$ for 23 hours | 1.4 | 92.3 | 0.9 | 2.5 | 18.3 | 12.5 | 68 |

*Calculated on basis of water-free copper precipitate.

This example shows that when the particulate precipitate metallic copper has an oxygen content greater than about 1% by weight that the rhenium may be leached therefrom in the absence of an oxidizing environment in the leach solution.

EXAMPLE VI

Two fifty gram samples of copper precipitate were leached in the presence of air at room temperature with 100 grams of water. The first sample, because of the acid in the precipitate, caused the pH of the leach solution to drop to about 2. The pH of the leach solution of the second sample was adjusted to between 7 and 8 with sodium carbonate. The results show that in the acid liquor only about 49.5% of the rhenium was extracted, whereas with a controlled pH of from about 7 to 8, 69% of the rhenium was extracted. While the rhenium is soluble in acid leach solutions, the rate of leaching and the selectivity relative to copper is improved in neutral or basic solutions.

What I claim is:

1. The process of recovering rhenium from particulate precipitate metallic copper wherein said rhenium is present in said precipitate copper in a concentration of from about 5 to about 300 parts per million and in a reduced state as $ReO_3$, $ReO_2$, $Re_2O_3$, $ReO$, $ReO_2 \cdot H_2O$, elemental rhenium, copper-rhenium oxides, and mixtures thereof as the result of being chemically or electrochemically precipitated along with copper from aqueous copper containing solutions consisting of the steps of:
   (a) slurrying said precipitate copper in the presence of an oxidizing agent with a leach solution selected from water, an aqueous acid solution and an aqueous caustic solution, said leach solution having a temperature less than about 100°C whereby said rhenium is selectively oxidized and consequently solubilized, said oxidizing agent having an oxidizing potential equivalent to air such that the rhenium is selectively oxidized to the water soluble perrhenate ion and copper is not substantially solubilized,
   (b) separating said leach solution from rhenium depleted precipitate copper, and
   (c) recovering rhenium from rhenium concentrated leach solution.

2. The process of claim 1 wherein said precipitate copper was precipitated from said copper containing solutions by contacting said copper containing solutions with a material selected from the group of bismuth, hydrogen, lead, tin, nickel, cobalt, cadmium, iron, chromium, zinc, manganese, aluminum, magnesium, tungsten, vanadium, beryllium, thorium, sodium, calcium, potassium, lithium and mixtures thereof.

3. The process of claim 1 wherein the leach solution having a pH value greater than about 6.5 and copper precipitate are slurried for at least 10 minutes up to about 10 hours at a temperature of from about 25°C up to about 100°C.

4. The process of claim 1 wherein the oxidizing agent is selected from the group consisting of air, oxygen and mixtures thereof and is bubbled up through the slurry during the leaching.

5. The process of claim 1 wherein said copper containing solutions are contacted with metallic iron to precipitate the copper as precipitate copper.

6. The process of claim 1 wherein said rhenium is recovered as a product selected from the group consisting of rhenium metal, perrhenic acid, potassium perrhenate, ammonium perrhenate, rhenium oxide, rhenium sulfide, calcium perrhenate and iron perrhenate.

7. The process of claim 1 wherein said leach solution from step (b) is recycled and repeating steps (a) and (b) to concentrate the rhenium in said leach solution prior to the recovering of rhenium.

8. The process of claim 1 wherein the rhenium is recovered by contacting the rhenium rich leach solution with an ion exchange agent selected from solid and liquid ion exchange agents, stripping the rhenium from the ion exchange agent with a stripping solution selected from the group consisting of perchloric, sulfuric and nitric acids, and recovering rhenium from the stripping solution in the form of perrhenic acid.

9. A process of recovering rhenium from particulate precipitate metallic copper wherein rhenium and copper are present in the precipitate copper in a reduced state, said rhenium concentration being between about 5 to about 300 parts per million and present as $ReO_3$, $ReO_2$, $Re_2O_3$, $ReO$, $ReO_2 \cdot H_2O$, elemental rhenium, copper-rhenium oxides, and mixtures thereof comprising the steps of drying the precipitate copper in an oxidizing environment whereby the rhenium is oxidized to a soluble state, said precipitate copper having an oxygen content between about 1 and about 10% by weight, leaching the dried precipitate copper with a leach solution selected from the group consisting of water, an aqueous acid solution and an aqueous caustic solution to selectively remove soluble oxidized rhenium from the precipitate copper, separating a rhenium containing leach solution from the precipitate copper to provide a rhenium rich leach solution and recovering the rhenium from the rhenium rich leach solution.

10. The process of claim 9 wherein the pH of the leach solution is above about 6.5.

11. The process of claim 9 wherein the leach solution and the dried precipitate copper are slurried for at least 10 minutes up to about 10 hours at a temperature of from about 25°C up to about 100°C.

12. The process of claim 9 wherein an oxidizing agent selected from the group consisting of air, oxygen and mixtures thereof is bubbled up through the leach solution during the leaching.

13. The process of claim 9 wherein the precipitate copper is the product of contacting an aqueous copper containing solution with metallic iron.

14. A process of recovering rhenium from a rhenium containing particulate precipitate copper, wherein the rhenium is present in the reduced form as $ReO_3$, $ReO_2$, $Re_2O_3$, $ReO_2 \cdot 2H_2O$, elemental rhenium, copper-rhenium oxides and mixtures thereof, and copper is present in the reduced form as the result of being precipitated from aqueous copper containing dilute solutions by contacting said solutions with metallic iron comprising the steps of:
   (a) leaching precipitate copper with an aqueous leach solution having a temperature less than about 100° C and a pH of at least 6.5 in the presence of an oxidizing agent to selectively oxidize the rhenium in the precipitate copper, said oxidizing agent having an oxidizing potential equivalent to air such that the rhenium is selectively oxidized to the water soluble perrhenate ion and copper is not substantially solubilized, said leach solution obtained from counter-current washing previously leached precipitate copper, whereby the rhenium is concentrated in the leach solution to at least 0.02 grams per liter, (b) separating rhenium rich leach solution from the precipitate copper residue, (c) feeding a portion of the rhenium rich leach solution to a rhenium recovery system where rhenium is recovered, and (d) returning a remaining portion of the rhenium rich leach solution to the leaching step.

15. The process of claim 14 wherein the oxidizing agent is supplied by bubbling an oxidizing agent selected from the group consisting of air, oxygen and mixtures thereof up through the leach solution.

16. The process of claim 14 wherein the portion of rhenium rich leach solution fed to the rhenium recovery system is contacted with an ion exchange agent selected from the group consisting of solid and liquid ion exchange agents, stripping the rhenium from the ion exchange agent with a stripping solution selected from perchloric acid, nitric acid, and sulfuric acid and recovering the rhenium from the stripping solution in the form of perrhenic acid.

17. A process of recovering rhenium from a rhenium containing particulate precipitate copper, wherein the rhenium is present in the reduced form as $ReO_3$, $ReO_2$, $Re_2O_3$, $ReO_2 \cdot 2H_2O$, copper-rhenium oxides and mixtures thereof, and copper is present in the reduced form as the result of being precipitated from aqueous copper containing dilute solutions by contacting said solutions with metallic iron comprising the steps of:

(a) drying the precipitate copper in an oxidizing environment selected from the group consisting of air, oxygen and mixtures thereof whereby the precipitate copper contains from about 1 to about 10% oxygen by weight, (b) leaching the dried precipitate copper with an aqueous leach solution having a temperature less than about 100° C and a pH of at least 6.5, said leach solution obtained from counter-current washing previously leached precipitate copper, whereby the rhenium is concentrated in the leach solution to at least 0.02 grams per liter, (c) separating rhenium rich leach solution from the precipitate copper residue, (d) feeding a portion of the rhenium rich leach solution to a rhenium recovery system where rhenium is recovered as a product selected from the group consisting of rhenium metal, perrhenic acid, potassium perrhenate, ammonium perrhenate rhenium oxide, rhenium sulfide, calcium perrhenate and iron perrhenate, and (e) returning a remaining portion of the rhenium rich leach solution to the leaching step.

18. The process of claim 17 wherein the portion of rhenium rich leach solution fed to the rhenium recovery system is contacted with an ion exchange agent selected from the group consisting of solid and liquid ion exchange agents, stripping the rhenium from the ion exchange agent with a stripping solution selected from perchloric acid, nitric acid, and sulfuric acid and recovering the rhenium from the stripping solution in the form of perrhenic acid.

* * * * *